(12) United States Patent
Hanaoka et al.

(10) Patent No.: US 8,072,849 B2
(45) Date of Patent: Dec. 6, 2011

(54) OPTICAL INTEGRATED MODULE AND OPTICAL PICKUP DEVICE

(75) Inventors: Toru Hanaoka, Tenri (JP); Masaru Ogawa, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 1236 days.

(21) Appl. No.: 11/448,383

(22) Filed: Jun. 6, 2006

(65) Prior Publication Data

US 2006/0280056 A1 Dec. 14, 2006

(30) Foreign Application Priority Data

Jun. 6, 2005 (JP) ................................. 2005-166231

(51) Int. Cl.
*G11B 7/00* (2006.01)
(52) U.S. Cl. .................................. 369/44.12; 369/44.14
(58) Field of Classification Search .................. 369/121, 369/112.1, 112.23, 103, 44.14, 44.23, 112.01, 369/112.28, 44.12, 44.15, 120, 122; 372/50.21, 372/50.1
See application file for complete search history.

(56) References Cited

U.S. PATENT DOCUMENTS

| | | | |
|---|---|---|---|
| 5,050,154 A * | 9/1991 | Shimozawa et al. ..... | 369/112.23 |
| 5,285,062 A * | 2/1994 | Lee ............................. | 369/44.14 |
| 5,905,750 A * | 5/1999 | Lebby et al. ................ | 372/50.21 |
| 6,038,203 A * | 3/2000 | Tajiri et al. .................. | 369/112.1 |
| 6,631,113 B1 * | 10/2003 | Freeman et al. ......... | 369/112.01 |
| 2002/0118479 A1 | 8/2002 | Yoshizawa et al. | |
| 2004/0202066 A1 | 10/2004 | Yoshizawa et al. | |
| 2004/0240502 A1 | 12/2004 | Yamamoto | |

FOREIGN PATENT DOCUMENTS

| | | |
|---|---|---|
| JP | 04-102239 | 4/1992 |
| JP | 07-210892 | 8/1995 |
| JP | 2000-048391 | 2/2000 |
| JP | 2001-250257 | 9/2001 |
| JP | 2001-339182 | 12/2001 |
| JP | 2002-260348 | 9/2002 |
| JP | 2002-314149 | 10/2002 |
| JP | 2003-101063 | 4/2003 |
| JP | 2003-298172 | 10/2003 |
| JP | 3520852 | 2/2004 |
| JP | 2004-363144 | 12/2004 |

* cited by examiner

*Primary Examiner* — Nabil Hindi
(74) *Attorney, Agent, or Firm* — Edwards Wildman Palmer LLP; David G. Conlin; William J. Daley, Jr.

(57) ABSTRACT

An optical integrated unit according to the present invention is an optical integrated unit, including: a semiconductor laser acting as a light source; at least one light-receiving element; a light-separating section for separating light emitted by the semiconductor laser from light reflected by an optical disc and for reflecting the light reflected by the optical disc so that the light reflected by the optical disc is directed to the light-receiving element; and a support substrate, wherein a second support substrate has a concave shape, the light-separating section is constituted of at least three prisms, the prisms positioned at both ends of the light-separating section are respectively attached to two protruding sections of the concave shape of the second support substrate, and the light-receiving element is attached to the light-separating section via a cover glass. As a result, it is possible to solve such a problem that the light-receiving element cannot be adjusted with high accuracy because of a thickness error of the support substrate or an intermediate substrate in conventional techniques.

18 Claims, 8 Drawing Sheets

PRIOR ART
FIG. 7 (a)
PRIOR ART
FIG. 7 (b)
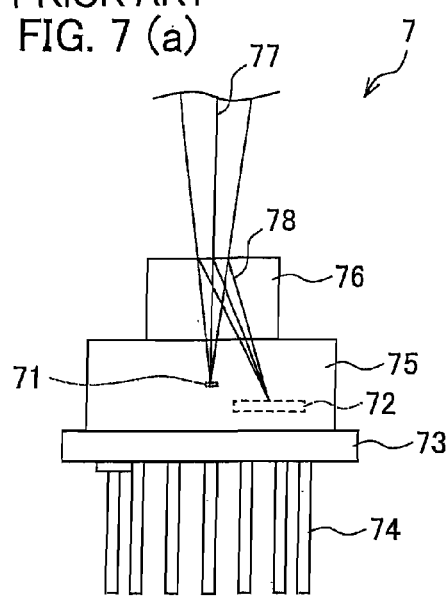
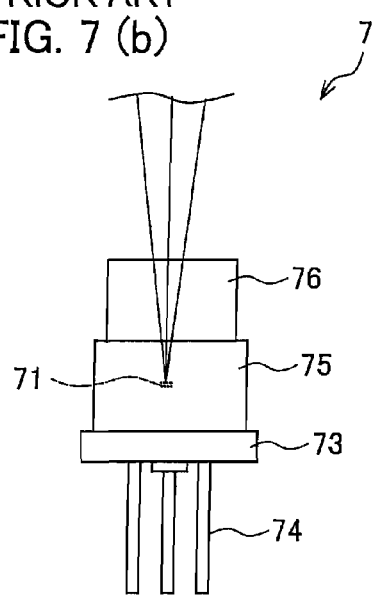
FIG. 7 (c) PRIOR ART
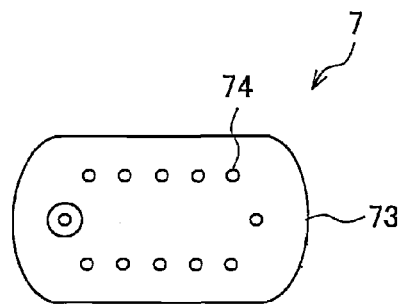

FIG. 8 (b) PRIOR ART

OPTICAL INTEGRATED MODULE AND OPTICAL PICKUP DEVICE

This non-provisional application claims priority under 35 U.S.C. §119(a) on patent application Ser. No. 166231/2005 filed in Japan on Jun. 6, 2005, the entire contents of which are hereby incorporated by reference.

FIELD OF THE INVENTION

The present invention relates to an optical pickup device used in recording or reproducing information to or from an optical recording medium such as an optical disc. The present invention particularly relates to (i) an optical integrated module in which a light source and a photodetector are provided independently of each other and (ii) an optical pickup device including the optical integrated module.

BACKGROUND OF THE INVENTION

As to a recording/reproducing device for recording/reproducing information to/from an optical recording medium such as an optical disc, there are two contradicting requests: a request for downsizing the recording/reproducing device and reducing the costs in fabricating the recording/reproducing device; and a request for increasing recording density of information.

Therefore, in order to downsize the recording/reproducing device, it has been considered to downsize an optical pickup device in the recording/reproducing device, and there have been proposed various methods for constituting an optical integrated module in which a plurality of elements in the optical pickup device are integrated.

An example of the optical integrated module is a hologram laser in which a semiconductor laser chip, a light-receiving element chip, and a hologram device are integrated in a single package. With reference to FIGS. 7(a) to 7(c), FIGS. 8(a), and 8(b), the following explains a hologram laser and an optical pickup device using the hologram laser. FIGS. 7(a) to 7(c) schematically illustrate the hologram laser. FIG. 7(a) illustrates the front of the hologram laser, FIG. 7(b) illustrates the left side of the hologram laser, and FIG. 7(c) illustrates the bottom of the hologram laser. Further, FIGS. 8(a) and 8(b) schematically illustrate an optical pickup device including the hologram laser in FIG. 7. FIG. 8(a) illustrates the front of the optical pickup device seen from an optical disc (not shown). FIG. 8(b) illustrates the side of the optical pickup device.

As illustrated in FIGS. 7(a) to 7(c), a hologram laser 7 includes: a semiconductor laser chip 71; a light-receiving element chip 72; a metal stem 73; leads 74; a cap 75; and a hologram glass 76.

The light-receiving element chip 72 in the hologram laser 7 includes: a light-receiving section including a plurality of photodiodes; an integrated circuit section for converting current outputs of the photodiodes into voltages, respectively, and for amplifying the current outputs; and a plurality of pads via which signal outputs of the integrated circuit section, a power source, and a ground terminal are connected with an outside. Each pad of the light-receiving element chip 72, and an anode and a cathode of the semiconductor laser chip 71 are connected with the leads 74 via metal wires in the cap 75.

As illustrated in FIGS. 8(a) and 8(b), the optical pickup device 8 includes components such as: the hologram laser 7; a collimating lens 81; a right-angle mirror 83; an objective lens 84; a flexible substrate (not shown) including a connection terminal section connecting to an external circuit. These components are provided in a housing 85 made of metal.

Laser light (emitted light) 77 emitted by the semiconductor laser chip 71 passes through the hologram glass 76, and then focuses on a recording surface of an optical disc 90 via the collimating lens 81, the right-angle mirror 83, and the objective lens 84 which are disposed outside the hologram laser 7. Reflected light 78 from the recording surface of the optical disc 90 tracks back and reaches the hologram glass 76. A hologram pattern is formed on an upper surface of the hologram glass 76, and diffracts the reflected light 78 from the optical disc 90 so that the reflected light 81 is converged onto the light-receiving element chip 72.

By using such hologram laser in which a semiconductor laser, a light-receiving element, and other optical components are integrated, it is possible to downsize the optical pickup device.

Further, as a method for integrating elements constituting an optical pickup device, other than the method in which the hologram laser is used, there is known a method for using an IC chip including a light source and a light-receiving element, namely, a laser coupler in which the light source and the light-receiving element are integrated (see Document 1: Japanese Unexamined Patent Publication No. 298172/2003 (Tokukai 2003-298172;published on Oct. 17, 2003) for example). Further, there is proposed a complex optical unit in which a light-emitting member (two-wavelength laser diode), a light-receiving member (semiconductor); and other components are integrated (see Document 2: Japanese Unexamined Patent Publication No. 339182/2001 (Tokukai 2001-339182; published on Dec. 7, 2001) for example).

On the other hand, in order to increase recording density of information in an optical recording medium, there is proposed multi-layering of a recording layer of the optical recording medium or increasing the number of apertures (NA) in an objective lens.

At that time, it is necessary to cancel stray light from other recording layer of the optical recording medium and/or to correct aberration of an optical system.

As a result, the amount of information signals is increased. A lot of terminals for signal outputs are necessary, accordingly. Generally, the number of terminals for signal outputs in a light-receiving element is 8 or so. In consideration of a power source, a ground terminal, a reference voltage input terminal, and a gain switching input terminal, the total number of terminals is 12 or so. In consideration of terminals for signal outputs used for cancellation of the stray light, correction of aberration of the optical system, and other additional functions of an optical pickup device, the total number of terminals in the light-receiving element is 20 or more. As the number of terminals is increased in this way, the number of wires connected with the terminals is also increased.

In view of the above, Document 1 proposes a method for arranging the laser coupler so that (i) input/output terminals are disposed on three sides of a bottom surface of the laser coupler and (ii) wires are drawn out of the fourth side of the bottom surface via a flexible substrate.

Document 2 proposes a method for providing external connecting terminals on both sides of a packaged light-receiving element, and for connecting the terminals with a flexible substrate.

However, in the method of Document 1, a semiconductor laser chip and a light-receiving element chip, each of which is in a bare chip state, are provided in the laser coupler so that the size of the laser coupler is downsized. As such, if a part of the chip has some defect, then the entire hologram laser or the entire laser coupler must be disposed of. This causes much loss of components.

To be specific, generally, it is difficult to inspect characteristics of a semiconductor laser chip or a light-receiving element chip each of which is in the bare chip state. Therefore the characteristics of the semiconductor laser chip and the characteristics of the light-receiving element chip must be inspected after the hologram laser or the laser coupler is made and the optical integrated module is fabricated. As a result, in the conventional method, if the characteristics of a semiconductor laser chip or the characteristics of a light-receiving element chip is inspected and judged to be defective, an entire optical integrated module must be disposed of. This causes mush loss of components.

Further, because it is difficult to adjust a mount position of the laser chip during fabricating the optical integrated module, it is necessary to design an optical system such as a hologram glass and a light-receiving element so that the hologram glass and the light-receiving element is most suitable for the size of the laser chip and radiation angle characteristics of the laser chip. In a case where a laser chip needs to be replaced with another laser chip with higher performance which is later developed and available, if there are differences in the size and/or characteristics of the laser chips, then optical design must be entirely reconsidered each time such a replacement is performed. This causes development time to be longer.

Further, in a case where a light source and a photodetector are integrated, it is difficult to carry out a positioning of the light source and the photodetector after the optical integrated module is fabricated.

Further, in the method of Document 2, although a packaged light-receiving element is used, the light-receiving element must be fixed to the main body of an optical integrated unit, after the light-receiving element is attached onto a reinforcing plate and is then combined with a flexible plate. As a result, fabrication is troublesome. Besides, the light-receiving element and terminals for the semiconductor laser do not exist on the same surface and therefore the flexible substrate must be bent in a complex manner, which makes working efficiency low.

SUMMARY OF THE INVENTION

The present invention was made in view of the foregoing problems. An object of the present invention is to realize (i) an optical integrated module which allows disposition loss of components to be reduced and allows a light source and a photodetector to be easily provided, and (ii) an optical pickup device including the optical integrated module.

In order to solve the problem, an optical integrated module according to the present invention is an optical integrated module, including: a support member for supporting a light source for emitting light onto an optical recording medium; and a photodetector which includes (i) a light-receiving section for receiving reflected light from the optical recording medium and (ii) input/output terminals for being connected with an external circuit, wherein the support member and the photodetector are provided independently of each other.

With the arrangement, the light source supported by the support member and the photodetector are provided independently of each other in the optical integrated module. As a result, characteristics of the light source and characteristics of the photodetector are independently checked before the optical integrated module is fabricated. Thus, even when the light source or the photodetector is defective, only the defective light source or the defective photodetector is disposed of. Therefore, it is possible to reduce disposition loss, compared with a conventional hologram laser or a conventional laser coupler, in which a light source and a photodetector are integrated.

Generally, when a light source and a photodetector are integrated, the position of the light source and the position of the photodetector must be adjusted with extreme accuracy. For example, in a case where a semiconductor laser chip acting as a light source and a light-receiving element chip for receiving light, each of which is in a bare chip state, are packaged in a laser coupler or a hologram laser, extremely high bonding accuracy is required. However, with the arrangement, the light source and the photodetector are independent of each other. As a result, when the optical integrated module is fabricated, it is easy to adjust the relative position between the light source and the photodetector, so that high bonding accuracy is not required.

It is preferable to arrange the optical integrated module according to the present invention so that the optical integrated module includes a flexible substrate connected with the external circuit, and the flexible substrate is electrically connected with the input/output terminals and at least a part of the flexible substrate is provided between the photodetector and the support member.

With the arrangement, the flexible substrate is electrically connected with the input/output terminals. As a result, it is possible to output, to the external circuit, an information signal detected by the photodetector. Further, the flexible substrate which is thinner and more flexible than a hard substrate is used, so that it is possible to downsize a space necessary for connecting the input/output terminals with the flexible substrate. Therefore, the optical integrated module can be downsized. Further, it is easy to change the location of the flexible substrate in accordance with a space in the optical integrated module, so that it is possible to change the location of the input/output terminals.

Further, with the arrangement, the flexible substrate is drawn out from a gap between the photodetector and the support member. As a result, the flexible substrate is protected by the photodetector and the support member. Therefore, the flexible substrate is less likely to be disconnected.

It is preferable to arrange the optical integrated module according to the present invention so that the input/output terminals are provided on a surface of the photodetector so as to be positioned opposite to a surface where the light-receiving section is provided.

With the arrangement, the input/output terminals are provided on the surface of the photodetector so as to be positioned opposite to the surface where the light-receiving section is provided. As a result, it is unnecessary for the flexible substrate to surround the photodetector so as to be connected with the input/output terminals, namely, the flexible substrate is downsized, so that the optical integrated module can be downsized.

It is preferable to arrange the optical integrated module according to the present invention so that the input/output terminals are provided in a lattice manner.

With the arrangement, the input/output terminals are provided in the lattice manner. As a result, it is possible to provide the input/output terminals so that each of the input/output terminals is provided with the same distance from one another. Therefore, it is easy to design wirings to be drawn out of the flexible substrate to the external circuit.

It is preferable to arrange the optical integrated module according to the present invention so that the input/output terminals are connected with the flexible substrate via reflow soldering.

With the arrangement, the input/output terminals are connected with the flexible substrate via reflow soldering, so that it is possible to connect the input/output terminals with the flexible substrate at once. This is effective when the number of the input/output terminals is large. Further, it is possible to reduce fabrication processes compared with a case where the input/output terminals are connected with the flexible substrate one by one, so that it is possible to reduce working time, defective connection, and fabrication costs. Note that, the reflow soldering is a method in which an appropriate solder is supplied beforehand to an area to be soldered and then the area is soldered by a heat process.

It is preferable to arrange the optical integrated module according to the present invention so that: the flexible substrate includes a drawn-out section for being connected with the external circuit, and a width of the drawn-out section is not more than a width of the photodetector.

With the arrangement, the width of the drawn-out section of the flexible substrate is not more than the width of the photodetector, so that a space occupied by the flexible substrate is small. Therefore, the optical integrated module can be downsized. Note that, the "width of the drawn-out section of the flexible substrate" is a length of the flexible substrate in a direction perpendicular to a direction in which the flexible substrate is extended from the photodetector at a time when the flexible substrate is connected with the photodetector. The "width of the photodetector" is a length of the outer shape of the photodetector in a direction perpendicular to a direction in which the flexible substrate is extended from the photodetector.

It is preferable to arrange the optical integrated module according to the present invention so that the light source supported by the support member is a semiconductor laser including a first package.

With the arrangement, the semiconductor laser acting as the light source has a package form, so that the semiconductor laser is highly resistant to external damages and accordingly reliability of the semiconductor laser is enhanced. Further, the semiconductor laser is attached to the optical integrated module while being contained in the package. Thus, it is easy to treat the semiconductor laser compared with a semiconductor laser in a bare chip state.

It is preferable to arrange the optical integrated module according to the present invention so that the first package is a CAN package.

With the arrangement, the first package is the CAN package, so that it is possible to use a general-purpose CAN package whose diameter is 5.6 mm or 3.3 mm. Therefore, even when the design of the semiconductor laser chip is changed, the outer shape of the semiconductor laser is the general-purpose CAN package, so that the semiconductor laser can be replaced by replacing the CAN package. Therefore, it is unnecessary to greatly change the design of the optical integrated module as a whole and it is possible to reduce developing period of the optical integrated module.

It is preferable to arrange the optical integrated module according to the present invention so that the first package is a lead-frame package.

With the arrangement, the first package is the lead-frame package. For example, when the semiconductor laser chip is packaged in the first package, the lead-frame package can be fabricated in such a manner that: a plurality of semiconductor laser chips are mounted on a large-size substrate for the lead-frame package and the substrate on which the semiconductor laser chips are mounted is divided into pieces and thus the lead-frame substrates each of which has the semiconductor laser chip thereon can be fabricated at once, and each of thus fabricated lead-frame substrates is packaged. Therefore, it is possible to shorten processes and to suppress the costs, compared with a case where the semiconductor laser chip is packaged on thus divided lead-frame substrate one by one.

It is preferable to arrange the optical integrated module according to the present invention so that the optical integrated module includes splitting means for separating the light emitted by the light source from the reflected light.

With the arrangement, the optical integrated module includes the splitting means for separating the light emitted by the light source from the reflected light, so that the photodetector can receive only the reflected light without being influenced by stray light derived from the emitted light.

It is preferable to arrange the optical integrated module according to the present invention so that: the splitting means includes (a) a first reflective surface which separates the emitted light from the reflected light, and (b) a second reflective surface which is provided so as to be parallel to the first reflective surface and which reflects the reflected light reflected by the first reflective surface, and the first reflective surface and the second reflective surface are provided so as to be inclined at an angle of 45 degrees, with respect to an optical axis of the emitted light, to a side where the photodetector is provided.

With the arrangement, the reflected light incident to the splitting means is reflected by the first reflective surface and separated from the emitted light. Here, the first reflective surface is inclined at an angle of 45 degrees, with respect to the optical axis of the emitted light, to the side where the photodetector is provided under the splitting means, so that the reflected light is reflected by 90 degrees by the first reflective surface and travels toward the second reflective surface. Further, the second reflective surface is also inclined at an angle of 45 degrees with respect to the optical axis of the emitted light, so that the reflected light is further reflected by 90 degrees by the second reflective surface. Therefore, it is possible to cause the optical axis of the reflected light reflected by the second reflective surface to be parallel to the optical axis of the emitted light. In other words, the optical axis of the reflected light incident to the splitting means is parallel to the optical axis of the reflected light emitted by the splitting means. Therefore, it is possible to provide the light source and the photodetector at the same predetermined side of the splitting means.

It is preferable to arrange the optical integrated module according to the present invention so that the support member includes a concave section for containing the photodetector therein.

With the arrangement, the support member includes the concave section for containing the photodetector therein, so that it is possible to contain the photodetector in the concave section and to protect the photodetector from external unexpected impulse.

It is preferable to arrange the optical integrated module according to the present invention so that the concave section is formed so as to support the splitting means.

With the arrangement, the concave section supports the splitting means, so that it is possible to stably provide the splitting means in the optical integrated module. Further, it is possible to simplify and downsize the structure of the optical integrated module, compared with a case where a mechanism for supporting the splitting means is provided independently of the concave section.

It is preferable to arrange the optical integrated module according to the present invention so that the support member has a partition for optically separating the light source from the photodetector.

With the arrangement, the support member has the partition for optically separating the light source from the photodetector, so that it is possible to prevent unnecessary stray light which came out of the light source from entering into the photodetector. Therefore, the photodetector can detect an accurate information signal.

It is preferable to arrange the optical integrated module according to the present invention so that: the photodetector includes a second package, and the second package includes a light-transmissive member on a surface where the reflected light is received, and at least a part of the second package is made of ceramics.

With the arrangement, the photodetector is contained in the package made of ceramics, so that there is no possibility that dust is produced from the edge of the substrate and is attached to the light-receiving surface of the photodetector, unlike a case where the photodetector is packaged using a glass epoxy substrate which is used for a general photodetector.

Further, in the general photodetector, transparent resin such as epoxy resin is used to seal the light-receiving surface side of the photodetector. Such transparent resin is not resistant to heat and therefore cannot be subjected to reflow soldering. However, with the arrangement, both of the ceramic substrate and the light-transmissive member (e.g. glass) which constitute the package are resistant to heat, so that reflow soldering can be used.

It is preferable to arrange the optical integrated module according to the present invention so that the light-receiving section is electrically connected with the second package via flip-chip bonding.

When the light-receiving section is connected with the second package via wire bonding for example, wires exist outside the photodetector, so that there is a possibility that the size of the package increases. On the other hand, with the arrangement, the light-receiving section is directly connected with the second package via flip-chip bonding, so that it is possible to downsize the second package.

The optical pickup device according to the present invention includes the optical integrated module.

With the arrangement, the optical pickup device includes the optical integrated module. As a result, it is easy to adjust the relative position between the light source and the photodetector, and even when the light source or the photodetector is defective, only the defective light source or the defective photodetector is disposed of, so that it is possible to reduce disposition loss, compared with a case where the light source and the photodetector are integrated. Further, it is possible to downsize the optical pickup device.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) is a front view of the optical integrated module. FIG. 1(b) is a bottom view of the optical integrated module.

FIG. 2(a) is a front view of the optical pickup device seen from the above (from an optical disc). FIG. 2(b) is a side view of the optical pickup device.

FIG. 6(a) is a front view of the optical integrated module. FIG. 6(b) is a bottom view of the optical integrated module.

FIGS. 7(a) to 7(c) schematically illustrate a conventional hologram laser unit. FIG. 7(a) is a front view of the conventional hologram laser unit. FIG. 7(b) is a side view of the conventional hologram laser unit. FIG. 7(c) is a bottom view of the conventional hologram laser unit.

FIG. 8(a) is a front view of the optical pickup device seen from the above (from an optical disc). FIG. 8(b) is a side view of the optical pickup device.

DESCRIPTION OF THE EMBODIMENTS

Embodiment 1

With reference to FIGS. 1(a) and 1(b) to FIG. 5, the following explains an embodiment according to the present invention.

Figure 1:
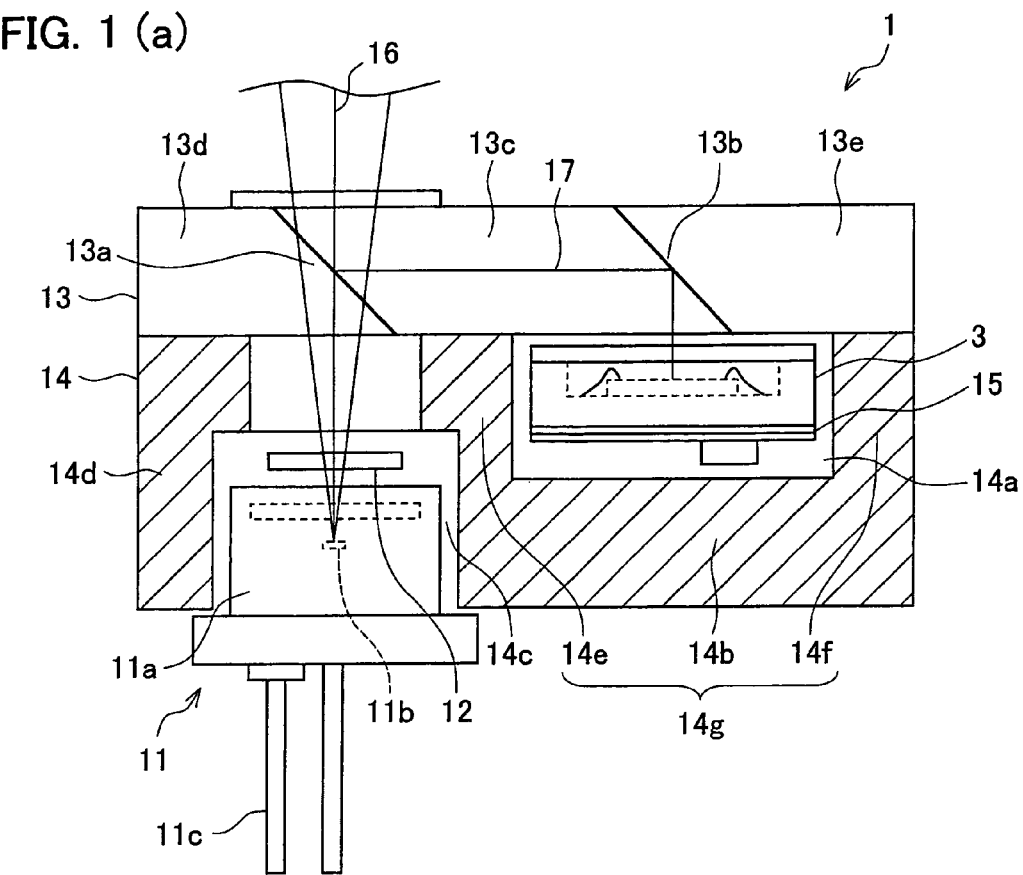
FIGS. 1(a) and 1(b) schematically illustrate an optical integrated module according to an embodiment of the present invention.
Figure 1:
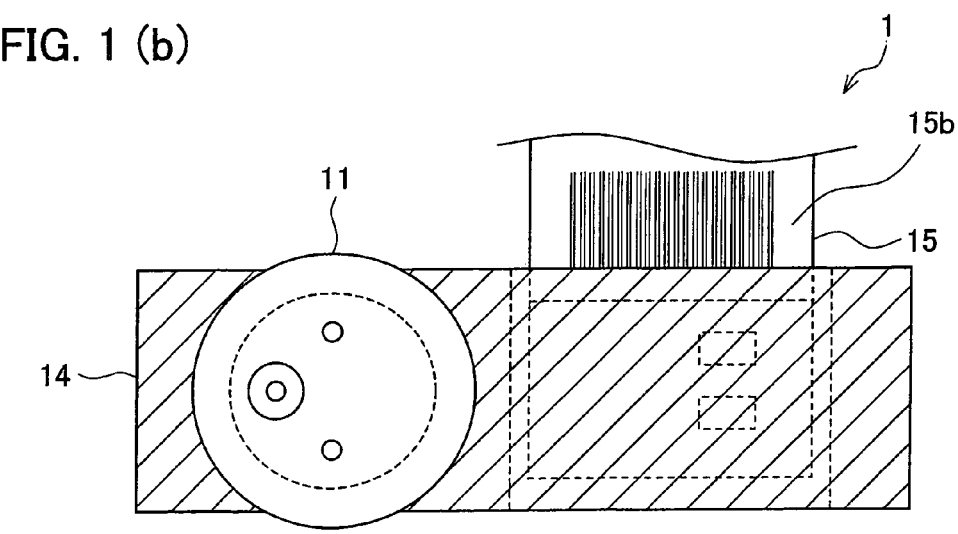
Figure 2:
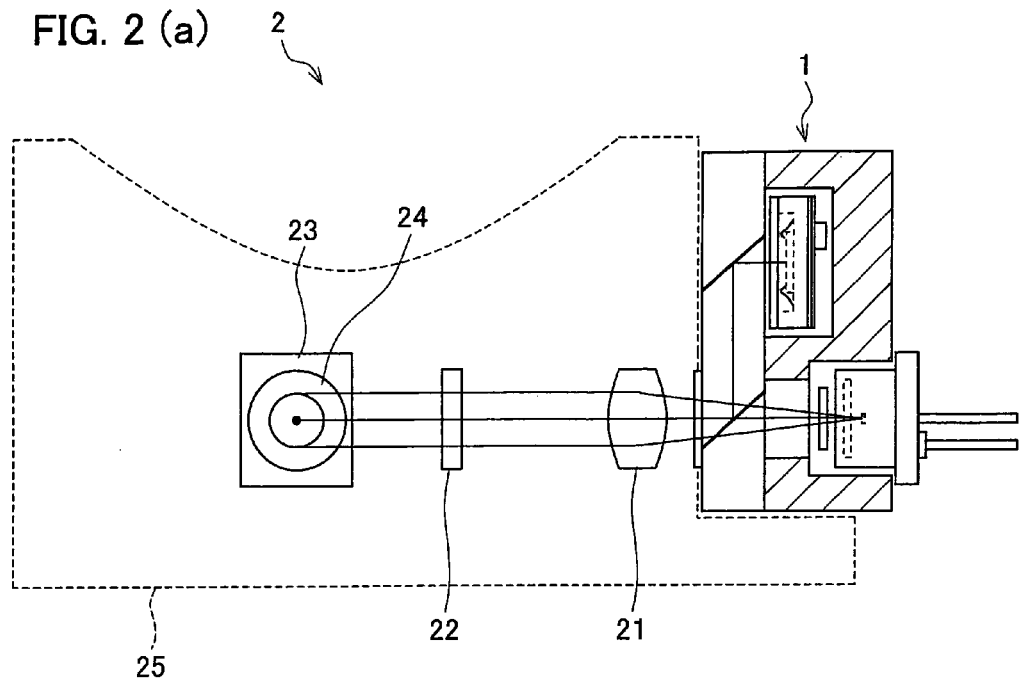
FIGS. 2(a) and 2(b) schematically illustrate an optical pickup device using the optical integrated module.
Figure 2:
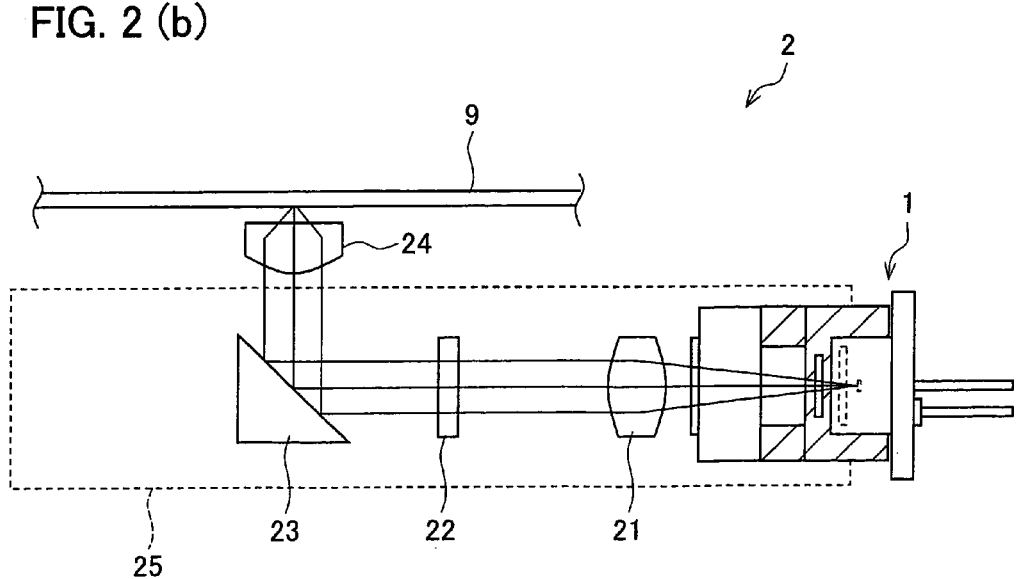
Figure 3:
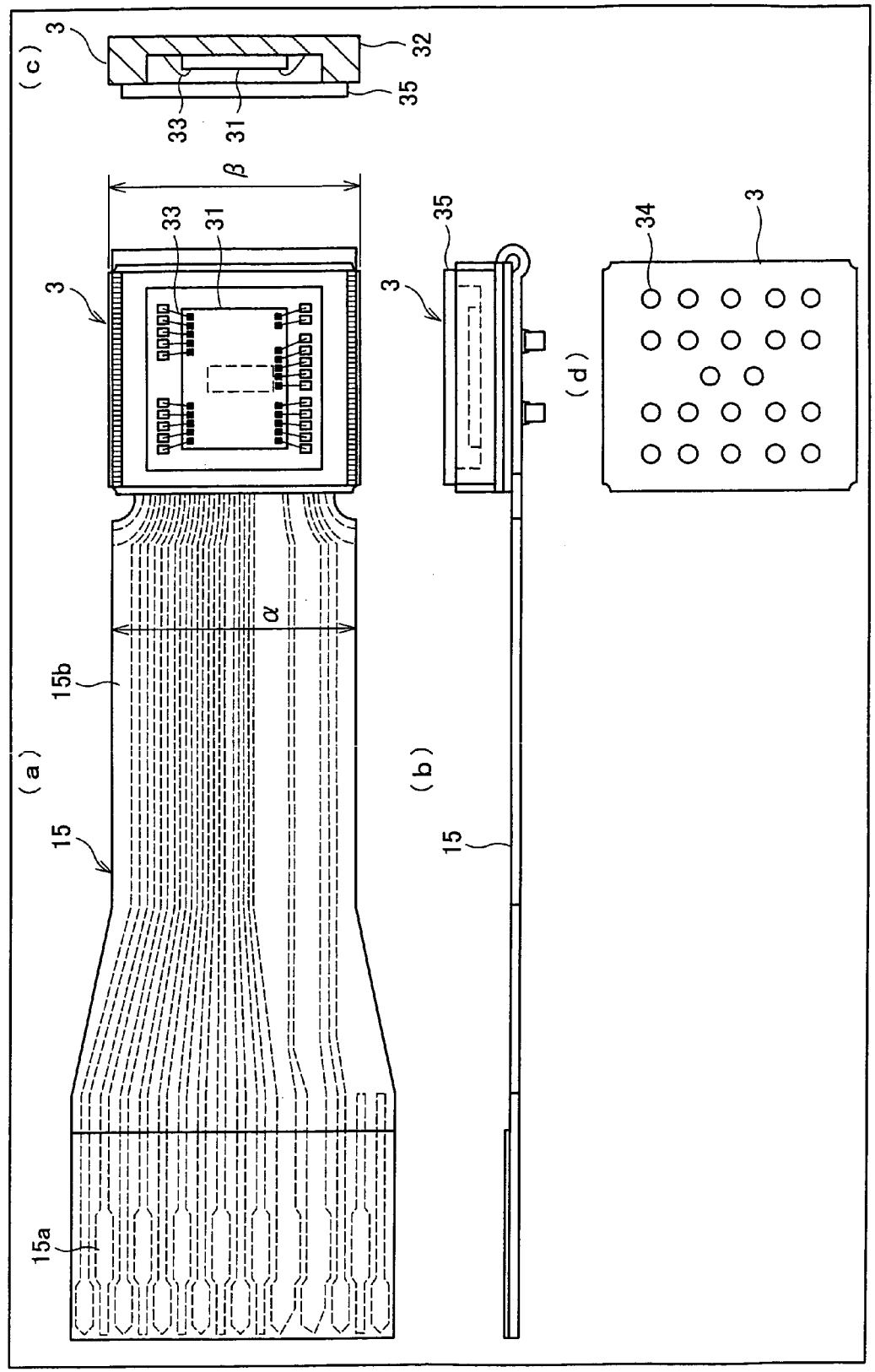
FIG. 3 schematically illustrates a disposition of a light-receiving element and a flexible substrate which are components of the optical integrated module.

First, with reference to FIGS. 1(a) and 1(b) to FIG. 3, the following schematically explains an optical integrated module and an optical pickup device including the optical integrated module. FIG. 1(a) schematically illustrates the front of the optical integrated module. FIG. 1(b) illustrates the bottom of the optical integrated module. Further, FIG. 2(a) schematically illustrates the front of the optical pickup device seen from an optical disc. FIG. 2(b) illustrates the side of the optical pickup device. Reference sign (a) of FIG. 3 illustrates the front of a light-receiving element and a module FPC which are connected with each other. Reference sign (b) of FIG. 3 is a side view of the light-receiving element in reference sign (a) of FIG. 3. Reference sign (c) of FIG. 3 is a right-side view of the light-receiving element in reference sign (a) of FIG. 3, which view is seen from the right side of the paper. Reference sign (d) of FIG. 3 is a rear view of the light-receiving element in reference sign (a) of FIG. 3.

As illustrated in FIGS. 2(a) and 2(b), an optical pickup device 2 according to the present embodiment includes: an optical integrated module 1; a collimating lens 21; a ¼ waveplate 22; a right-angle mirror 23; an objective lens (light-converging means) 24; a first flexible substrate which includes a connecting terminal section to be connected with an external circuit (the substrate is not shown; hereinafter referred to as "pickup FPC (Flexible Printed Circuits)"); and other components. These components are provided in a housing 25 made of metal.

As illustrated in FIG. 2(b), the optical pickup device 2 is provided so as to face an optical disc (optical recording medium) 9.

Here, laser light (emitted light) 16 emitted by the optical integrated module 1 is converged onto the optical disc 9 via the collimating lens 21, the ¼ waveplate 22, the right-angle mirror 23, and the objective lens 24, and is reflected by the optical disc 9. Then, reflected light 17 is converged onto a light-receiving element (photodetector) 3 (later described) in the light integrated module 1 via the objective lens 24, the right-angle mirror 23, the ¼ waveplate 22, and the collimating lens 21.

The following explains components constituting the optical pickup device 2.

The collimating lens 21 collimates the laser light emitted by the optical integrated module 1.

The ¼ waveplate 22 converts linear polarized light (p-polarized light) into circularly polarized light, and also converts circularly polarized light into linear polarized light (s-polarized light).

The right-angle mirror 23 directs the laser light which has passed through the ¼ waveplate 22 to the optical disc 9.

The objective lens 24 converges the light onto the optical disc 9.

As illustrated in FIG. 1(a), the optical integrated module 1 includes: a blue-violet semiconductor laser (light source; hereinafter referred to as a "laser") 11; a ½ waveplate 12; a support member 14 for supporting the laser 11; a polarized beam splitter (splitting means; hereinafter referred to as "PBS") 13; a light-receiving element (photodetector) 3; and a second flexible substrate (flexible substrate; hereinafter referred to as "module FPC") 15 for connecting the optical integrated module 1 with an external circuit and other components.

Next, the following explains components constituting the optical integrated module 1.

The laser 11 is a light source for emitting laser light which irradiates the optical disc 9. The laser 11 includes a CAN package (first package) 11a, a semiconductor laser chip (hereinafter referred to as a "laser chip") 11b, and leads 11c.

The CAN package 11a is a cylindrical metal package, and has on its upper part. a window through which the laser light passes.

The laser chip 11b generates laser light. The laser chip 11b is contained in the CAN package 11a. Further, an anode and a cathode, which constitute the laser chip 11b, are connected with the leads 1 c provided under the CAN package 11a via metal wires. The leads 11c can be connected with the external circuit.

Further, the ½ waveplate 12 is an optical element which changes a polarization direction of the emitted light by 90 degrees. This works for compensating light intensity distribution of the emitted light. The ½ waveplate 12 is provided so as to be on the optical axis of the emitted light 16 emitted by the laser 11.

Further, the PBS 13 includes: a first optical member 13c which has a parallelogram shape; and a second optical member 13d and a third optical member 13e each of which has a trapezoid shape. The second optical member 13d and the third optical member 13e are provided on both sides of the first optical member 13c (on the left and right sides of the first optical member 13c). Further, the first optical member 13c includes two surfaces which are parallel to each other, and the two surfaces constitute a first reflective surface 13a and a second reflective surface 13b, respectively. Further, the first reflective surface 13a and the second reflective surface 13b are designed so as to be provided at an angle of 45 degrees, with respect to the optical axis of the reflected light 17 incident onto the PBS 13, to a side where the light-receiving element 3 is provided.

Further, the light-receiving element 3 receives the reflected light 17 from the optical disc 9, and detects an information signal of the optical disc 9 from the reflected light 17 thus received. For that reason, the light-receiving element 3 is fixed to a place of the PBS 13, from which place the reflected light 17 goes out.

As illustrated in FIG. 3, the light-receiving element 3 includes: a light-receiving element chip 31; a second package 32; a light-transmissive member 35 for sealing the second package 32; and input/output terminals 34 for outputting an output signal from the light-receiving element chip 31 to the external circuit, and for inputting an input signal from the external circuit to the light-receiving element chip 31.

The light-receiving element chip (light-receiving section) 31 includes: a light-receiving acquisition section made of photodiodes for receiving the reflected light 17 from the optical disc 9; an integrated circuit section for converting current outputs of the photodiodes into voltages and amplifying the voltages thus converted; and a plurality of pads for inputting/outputting information signals, and for supplying a power.

The second package 32 is made of sintered alumina ceramics or glass ceramics for example.

Further, the light-transmissive member 35 transmits the reflected light, and has an anti-reflective coating formed on a surface where the reflected light is incident. The light-transmissive member 35 is made of glass for example.

The light-receiving element chip 31 is contained in the second package 32, and is surrounded by the second package 32. The light-receiving element chip 31 is attached to the second package 32 via silver paste for example. Further, the light-transmissive member 35 is provided on the upper part of the second package 32 (on a side where the reflected light 17 is incident). As a result, the second package 32 containing the light-receiving element chip 31 is sealed.

Further, the light-receiving element chip 31 includes connecting pads which are connected, via metal wires 33, with connecting pads formed in the second package 32. Note that, here, for convenience of explanation, the surface where the light-receiving element chip 31 is mounted, namely, the internal surface of the second package 32 is referred to as a "front surface of the package", and the surface which is opposite to the front surface of the package and where the light-receiving element chip 31 is not mounted, namely, the outer surface of the second package 32 is referred to as a "rear surface of the package". Further, for convenience of explanation, the "rear surface of the package" is also referred to as a "rear surface of the light-receiving element chip".

The light-receiving element chip 31 is electrically connected with the input/output terminals 34 formed on the rear surface of the second package 32, via (i) circuit patterns formed on the front and rear surfaces of the second package 32 and (ii) a through-hole or through-holes which penetrates or penetrate the second package 32 so as to electrically connect its front surface to its rear surface.

The input/output terminals 34 formed on the light-receiving element 3 have a round shape, and are disposed on the rear surface of the second package 32 in a lattice manner. In the present embodiment, in the center of the rear surface of the second package 32, some of the input/output terminals 34 are disposed in a zigzag manner. The disposition of the input/output terminals 34 may be changed so as to be suitable for connection with the module FPC 15, as long as the input/output terminals 34 are disposed in an LGA (Land Grid Array) form.

Further, the module FPC 15 is a flexible and substantially rectangular substrate to be connected with the external circuit. The module FPC 15 includes a terminal section 15a to be connected with the external circuit, a drawn-out section 15b which is drawn out of the optical integrated module 1, and a plurality of lands to be connected with the input/output terminals 34, and other components.

The module FPC 15 has wires formed on the front surface of the module FPC 15, and has the terminal section 15a provided on one end of the module FPC 15 and the lands (not shown) on the other end. Further, the drawn-out section 15b is provided between the terminal section 15a and the lands, and the terminal section 15a is electrically connected with the lands via the wires formed on the front surface of the drawn-out section 15b.

Then, the lands are connected with the input/output terminals 34 via solder. As a result, the light-receiving element 3 is fixed with the module FPC 15 so as to be combined with the module FPC 15. Then, the drawn-out section 15b is drawn out of a side of the rear surface of the light-receiving element 3 and extended. As a result, it is possible to electrically connect the light-receiving element 3 with the external circuit and to input/output an information signal.

Further, in consideration of the design rule and the like of the module FPC 15, the terminal diameter and the pitch between terminals of the input/output terminals 34 of the light-receiving element 3 are designed so that all wires can be drawn out of (can be extended from) a side of the light-receiving element 3. Namely, the terminal diameter and the pitch between terminals of the input/output terminals 34 are designed so that a certain clearance between each of the input/output terminals 34 and a drawn-out line is maintained at a time when the input/output terminals 34 are connected with the module FPC 15.

Next, the support member 14 includes: a support section 14c for supporting the laser 11 and the ½ waveplate 12; and a concave section 14a for containing the light-receiving element 3 and the module FPC 15 therein.

Further, the support section 14c includes: a first wall section 14d provided on the left side of a window section through which laser light is emitted; and a second wall section 14e provided on the right side of the window section. The first wall section 14d and the second wall section 14e directly fix the laser 11 and the ½ waveplate 12 and thus support the laser 11 and the ½ waveplate 12. Further, the window section through which the emitted light 16 passes is made in the upper section of the support member 14c so as to be positioned on the optical axis of the emitted light 16.

The concave section 14a is constituted of: the second wall section 14e and a third wall section 14f which face each other; and a bottom section 14b. The light-receiving element 3 and the module FPC 15 are inserted into the concave section 14a and the light-receiving element 3 and the module FPC 15 are surrounded by the concave section 14a. Namely, the second wall section 14e and the third wall section 14f are provided on the left side and the right side, respectively, of the light-receiving element 3 and the module FPC 15 so that the second wall section 14e and the third wall section 14f face each other, and the bottom section 14b is provided under the light-receiving element 3. In this way, by surrounding the light-receiving element 3, the concave section 14a protects the light-receiving element 3 from mechanical shock.

Further, as illustrated in FIG. 1(b), the module FPC 15 is drawn out of the concave section 14a containing the light-receiving element 3 therein and provided in the support member 14, so that the module FPC 15 extends out of the plane of FIG. 1(a). In other words, the drawn-out section 15b is externally drawn out of the optical integrated module 1. Namely, a part of the flexible substrate exists between the light-receiving element 3 and the support member 14 and the rest of the flexible substrate is drawn out from a gap between the light-receiving element 3 and the support member 14.

Further, the second wall section 14e acts as a partition for optically separating the laser 11 from the light-receiving element 3. Therefore, it is possible to prevent unnecessary stray light which came out of the laser 11 from entering into the light-receiving element 3.

Further, the PBS 13 is provided on the upper part of the support member 14. At least the second wall section 14e and the third wall section 14f support the PBS 13. As a result, the PBS 13 is strongly supported at a part where the light-receiving element 3 is disposed. Therefore, it is possible to stably provide the PBS 13 on the optical integrated module 1. Besides, the first wall section 14d also supports the PBS 13, so that the PBS 13 is further strongly supported.

Further, as described above, the light-receiving element 3 is provided on a part where the reflected light 17 is emitted by the PBS 13 and the light-receiving element 3 is disposed inside the concave section 14a provided in the support member 14.

Here, a portion integrally formed from the support section 14c to the concave section 14a is defined as a cover section 14g (namely, the cover section 14g is a portion in which (i) the bottom section 14b formed at the concave section 14a and (ii) a plurality of wall sections (the second wall section 14e and the third wall section 14f) are integrated.

Therefore, the light-receiving element 3 and the module FPC 15 are positioned between the PBS 13 and the cover section 14g. Namely, the PBS 13, the light-receiving element 3, the module FPC 15, and the cover section 14g are provided in this order in a direction in which the reflected light 17 from the optical disc 9 travels. The cover section 14g allows protection of a section connecting the light-receiving element 3 with the module FPC 15.

Next, the following explains operations of the optical pickup device 2 including the optical integrated module 1 according to the present embodiment.

The laser light (emitted light) 16 emitted by the laser 11 passes through the ½ waveplate 12 and the PBS 13 and then is incident to the collimating lens 21 positioned outside the optical integrated module 1, so. as to be collimated light. The collimated light focuses on the recording surface of the optical disc (optical recording medium) 9 via the ¼ waveplate 22, the right-angle mirror 23, and the objective lens 24. The laser light (reflected light) 17 reflected by the optical disc 9 tracks back, and reaches the first reflective face 13a of the PBS 13. The polarization direction of the reflected light 17 is changed by 90 degrees from that of the emitted light 16 at a time when the reflected light 17 passes through the ¼ waveplate 22, so that the reflected light 17 is turned by 90 degrees by the first reflective surface 13a and reaches the second reflective surface i3b. Further, the reflected light 17 is turned by 90 degrees by the second reflective face 13b and emitted from the PBS 13. The reflected light 17 emitted from the PBS 13 reaches the light-receiving element 3. The reflected light 17 is converted by the light-receiving element 3 into an information signal and the information signal is transmitted to the external circuit via the module FPC 15 connected with the light-receiving element 3.

Further, in the present embodiment, the laser 11 and the light-receiving element 3, each of which is supported by the support member 14, are provided in the optical integrated module 1 so that the laser 11 and the light-receiving element 3 are independent of each other. As a result, it is easy to adjust the position of the laser 11 and the position of the light-receiving element 3 when the optical integrated module 1 is fabricated. Further, when the laser 11 or the light-receiving element 3 is defective, it is possible to dispose of only the defective laser 11 or the defective light-receiving element 3, so that disposition loss can be reduced.

Further, generally, when the relative position between a semiconductor laser and a light-receiving element is changed, it is impossible for a light-receiving element to receive laser light with high accuracy. ITjerefore, as to a package in which the semiconductor laser and the light-receiving element are integrated, when the semiconductor laser and the light-receiving element each of which is in a bare chip state are packaged, it is necessary to package the semiconductor laser and the light-receiving element (to perform bonding) with extreme high accuracy. On the other hand, in the present embodiment, the position of the laser 11 is adjusted in relation to the position of the light-receiving element 3 after the laser chip 11b is packaged in the CAN package 11a, so that the laser 11 can be used without any problem even when the laser chip 11b is less accurately fixed in the CAN package 11a. Therefore, it is easy to perform a laser chip packaging process.

Further, in the present embodiment, the module FPC 15 is electrically connected with the input/output terminals 34. The flexible substrate is flexible and accordingly can be provided considerably freely. As a result, it is possible to downsize a space in which the module FPC 15 is connected with the input/output terminals 34 and a space necessary for drawing out the module FPC 15, so that it is possible to downsize the concave section 14a. Therefore, although the laser 11 and the light-receiving element 3 are independent of each other, it is possible to prevent the optical integrated module 1 from being larger than a conventional optical integrated module in which the laser and the light-receiving element are integrated.

Further, in the present embodiment, the laser 11 is directly fixed with the support member 14. However, the present invention may be arranged so that: the laser 11 is fixed with a holder (not shown) which surrounds the laser 11, and the holder with which the laser 11 is fixed is fixed with the support member via adhesive. At that time, even when the laser 11 is small and is difficult to be handled, it is possible to adjust the position of the holder which is larger than the laser 11 in relation to the support member 14, so that it is easy to adjust the position of the laser 11 in relation to the support member 14.

Further, the present invention may be arranged so that: the laser chip 11b is contained in the CAN package 11a and the CAN package 11a is sealed. This arrangement is advantageous in terms of moisture prevention (inhibition of oxidization) and anti-shock of the laser chip 11b, which enhances the reliability of the laser chip 11b.

Further, as the CAN package 11a, it is possible to use a CAN package whose diameter is 5.6 mm or 3.3 mm, which is commonly used for an optical recording medium. As a result, even when a laser chip with higher performance is developed and the former laser chip is replaced with a new one, the replacement can be performed merely by replacing the former CAN package with a new CAN package. As a result, it is unnecessary to greatly change the whole design of the optical integrated module 1, so that it is possible to reduce developing period of the optical integrated module 1.

Further, the second package 32 is made of alumina ceramics or glass ceramics. Further, the light-transmissive member 35 for sealing the second package 32 is made of glass and the like. Therefore, both the second package 32 and the light-transmissive member 35 are highly resistant to heat, so that it is possible to solder the input/output terminals 34 to the lands at once via reflow soldering. As a result, even when the number of the input/output terminals 34 is 20 or more, the present embodiment allows easier soldering, reduced number of defective soldering, and shortened working time, compared with a case where all the terminals are soldered one by one. Further, the material of the second package is not limited to ceramics. The material may be anything as long as the material is highly resistant to heat.

Generally, a light-receiving element used for an optical recording medium is made in such a manner that: a light-receiving element chip is mounted on a glass epoxy substrate and the light-receiving element chip is molded by transparent epoxy resin. In the manner, there is a possibility that dust is generated from the edge of the glass epoxy substrate and the dust is attached to a light-receiving face. In the present embodiment, the second package 32 is made of sintered alumina ceramics or glass ceramics and is advantageous in that such dust is not generated.

Further, for example, the epoxy resin may be deteriorated by irradiation of blue-violet laser light. In the present embodiment, the light-receiving surface side of the second package 32 is sealed by the light-transmissive member 35 made of glass and covered with the anti-reflective coating, so that the light-receiving element 3 is not deteriorated by the blue-violet laser light.

Further, in the present embodiment, the first reflective surface 13a and the second reflective surface 13b of the PBS 13 are parallel to each other and are positioned so as to be provided at an angle of 45degrees, with respect to the optical axis of the reflected light 17, to the part where the light-receiving element 3 is provided.

As a result, the reflected light 17 incident to the PBS 13 is turned by 90 degrees by the first reflective surface 13a and the reflected light 17 reflected by the second reflective surface 13b is turned by 90 degrees. Therefore, the reflected light 17 emitted by the PBS 13 is incident to the, light-treceiving surface of the light-receiving element 3 so as to be parallel to the optical axis of the emitted light 16. In other words, by causing the second reflective surface 13b to turn the reflective light 17 by 90 degrees, it is possible to provide the laser 11 and the light-receiving element 3 so that both the laser 11 and the light-receiving element 3 face in the same direction toward the PBS 13. As a result, it is possible to dispose input/output terminals (not shown) provided in the laser 11 and the input/output terminals 34 provided in the light-receiving element 3 so that both the input/output terminals provided in the laser 11 and the input/output terminals 34 are positioned in the same direction. Therefore, by causing wires from both the laser 11 and the light-receiving element 3 to be drawn into a single area, it is possible to eliminate an unnecessary space, so that it is possible to downsize the optical integrated module 1 as a whole.

Further, in the present embodiment, the light-receiving element chip 31 is mounted in the second package 32 via wire bonding. However, the light-receiving element chip 31 may be mounted in the second package 32 via flip-chip bonding. At that time, it is unnecessary to consider wirings of wires (metal wires 31), so that it is possible to downsize the package (to make the package thinner). Namely, it is possible to form a thinner light-receiving element 3.

As a result, the total thickness of the light-receiving element 3 and the module FPC 15 can be thinner, so that it is possible to downsize the concave section 14a of the support member 14. Namely, the cover section 14g which supports the light-receiving element 3 and the module FPC 15 can be as thick as possible within a predetermined range. As a result, it is possible to increase the strength of the support member 14. At that time, when the support member 14 has enough strength, it is unnecessary to make the cover section 14g thick, so that it is possible to cause the laser 11 to be as close as possible to the light-receiving element 3. Therefore, it is possible to further downsize the optical integrated module 1.

Further, in the present embodiment, all the input/output terminals 34 are provided on the rear surface (bottom surface) of the light-receiving element 3 and the wires are drawn out of only a single side of the light-receiving element 3, so that the width ($\alpha$) of the drawn-out section 15b of the module FPC 15 may be not more than the width ($\beta$) of the light-receiving element 3 (the width of the side of the light-receiving element, from which side the flexible substrate is drawn out). As a result, the size of the concave section 14a of the support member 14 may be as small as possible on condition that the concave section 14a does not deform the outer shape of the light-receiving element 3, so that it is possible to cause the laser 11 to be as close as possible to the light-receiving element 3 while the partition (the wall section 14e) of the support member 14 is still provided. Therefore, compared with the conventional optical integrated module, the optical integrated module 1 is not upsized, besides the optical integrated module 1 can be downsized. Further, the width of the module FPC 15 is narrower than that of the light-receiving element 3, so that the position of the module FPC 15 can be easily adjusted in such a manner that: the sides of the light-receiving element 3 with which the module FPC 15 is fixed are seized and thus the position of the light-receiving element 3 is adjusted. Note that, here, "the width of the drawn-out section 15b " means the length of the drawn-out section 15b parallel to the side of the light-receiving element 3 of which side the flexible substrate is drawn out. Further, "the width of the light-receiving element 3" means the length of the side of the light-receiving element 3 of which side the flexible substrate is drawn out.

Further, when the size of the light-receiving element 3 is relatively small compared with the size of whole the optical integrated module 1 as described above, it is possible to provide an enough space between the light-receiving element 3 and the concave section 14a of the support member 14. Generally, when the input/output terminals 34 are connected with the module FPC 15, the module FPC 15 has such a size as to correspond to the size of solder fillet. In consideration of that, it is possible to form the module FPC 15 so that the module FPC 15 is larger than the light-receiving element 3. Namely, it is possible for the module FPC 15 to surround the light-receiving element 3. Therefore, it is possible to arrange the present invention so that wirings are drawn out of both sides of the light-receiving element 3. Namely, it is possible to provide the input/output terminals 34 not only on the rear face of the second package 32 of the light-receiving element 3 but also on the sides of the second package 32 (wall sections of the second package 32). As a result, it is possible to further increase the number of the input/output terminals 34, which is effective in a case where the number of input/output signals (information signals) is increased so as to correspond to cancellation of stray light, correction of aberration of an optical system, and other additional functions of an optical pickup device.

Figure 4:
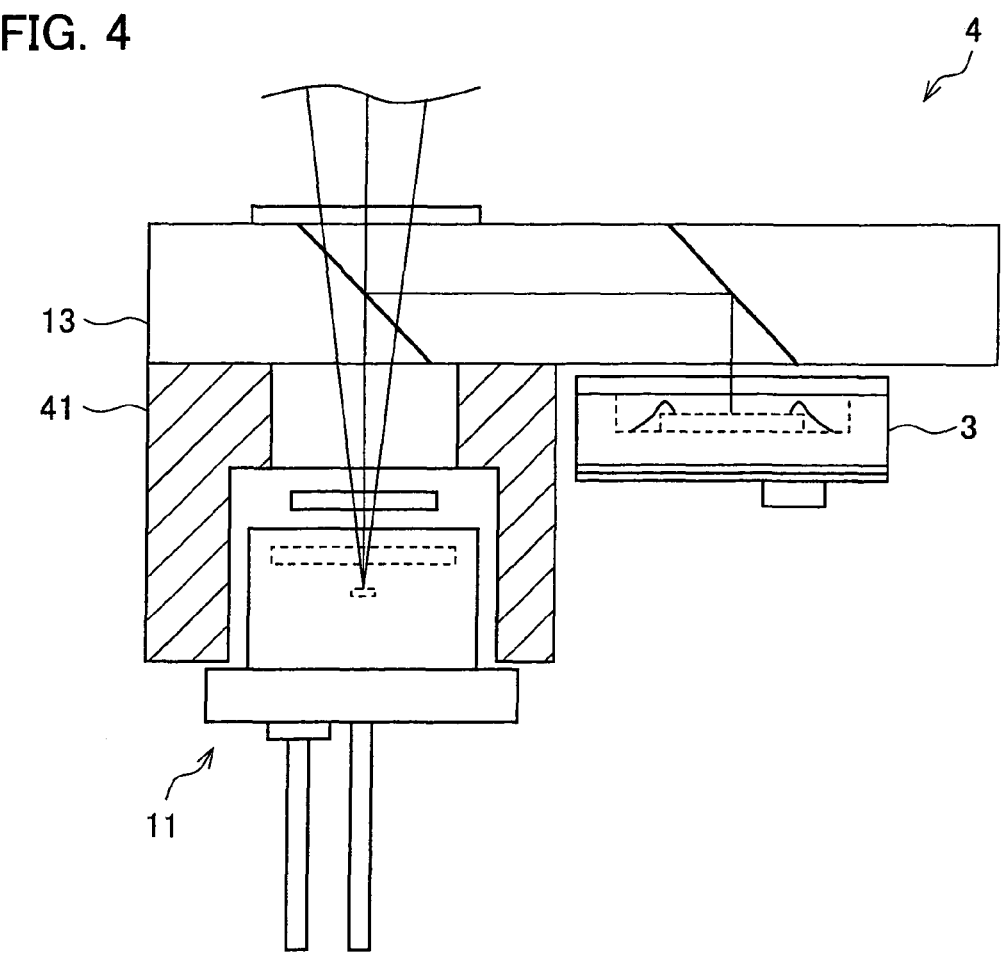
FIG. 4 schematically illustrates a problem of an optical integrated module whose support member does not include a concave section for containing the light-receiving element therein.
Figure 5:
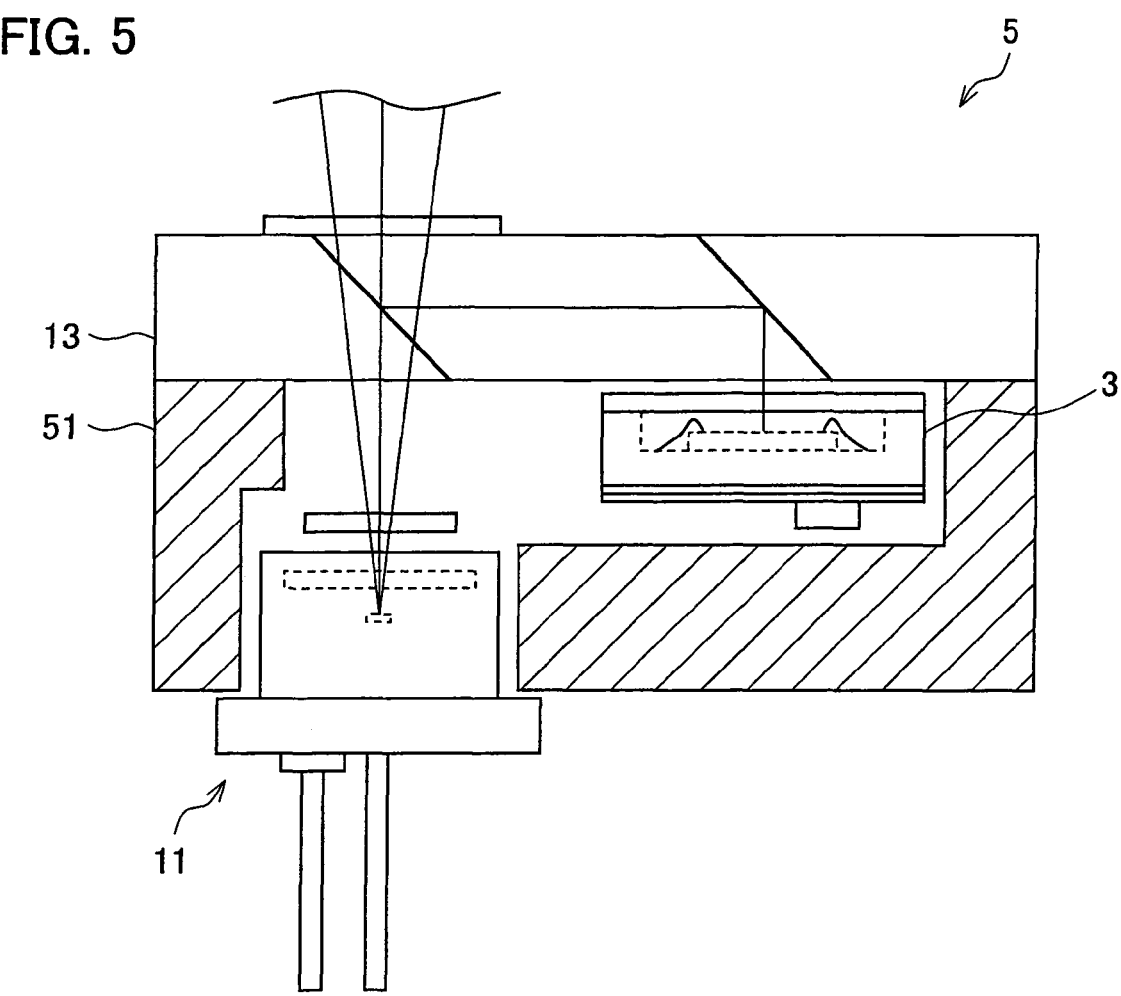
FIG. 5 schematically illustrates a problem of an optical integrated module whose support member does not include a concave section for containing the light-receiving element therein.

Next, FIGS. 4 and 5 illustrate comparative examples in cases where the support member 14 of the optical integrated module 1 illustrated in FIGS. 1(a) and 1(b) is changed. The comparative examples illustrate a state in which a light-receiving element is provided without providing a concave section in the support member of the optical integrated module.

In the case of the optical integrated module in FIG. 4, a support member 41 does not have the concave section, so that the light-receiving element 3 is not surrounded by the concave section. As a result, an end of the PBS 13 is not supported by the support member 41, so that the PBS 13 is mechanically unstable in the optical integrated module 4. Further, in the case of the optical integrated module 5 in FIG. 5, the light-receiving element 3 is contained in a support member 51, so that the PBS 13 is stably supported by the support member 51. However, there is no partition between the laser 11 and the light-receiving element 3, so that there is a possibility that the emitted light 16 of the laser 11 may stray into the light-receiving element 3. As a result, it is impossible to obtain exact signal information.

Therefore, by disposing the light-receiving element 3 in the concave section 14a of the support member 14 as illustrated in FIGS. 1(a) and 1(b), it is possible for the support member 14 to stably support the PBS 13 and to prevent the emitted light 16 of the laser 11 from straying into the light-receiving element 3.

As described above, with the present embodiment, in the optical integrated module on which the laser and the light-receiving element are mounted, it is easy to draw out wirings from a lot of input/output terminals of the light-receiving element and thus to downsize the optical integrated module as a whole. Further, by applying the optical integrated module according to the present embodiment to an optical pickup device, it is possible to downsize the optical pickup device while the advantages in using the optical integrated module remain.

Embodiment 2

Figure 6:
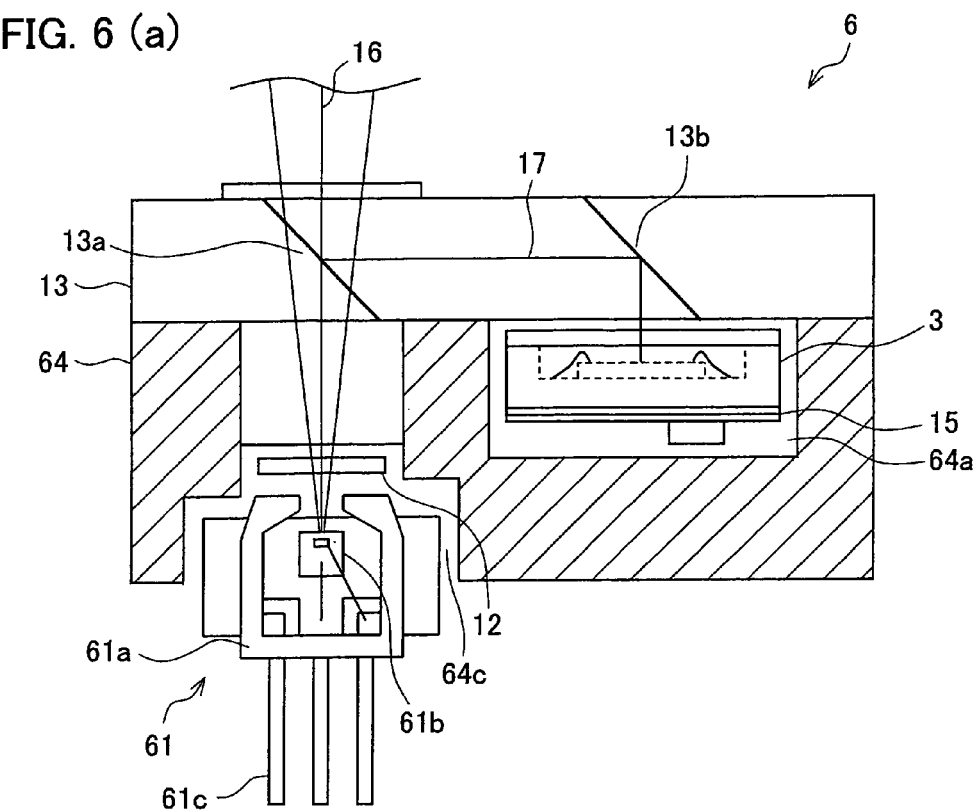
FIGS. 6(a) and 6(b) schematically illustrate an optical integrated module according to another embodiment of the present invention.
Figure 6:
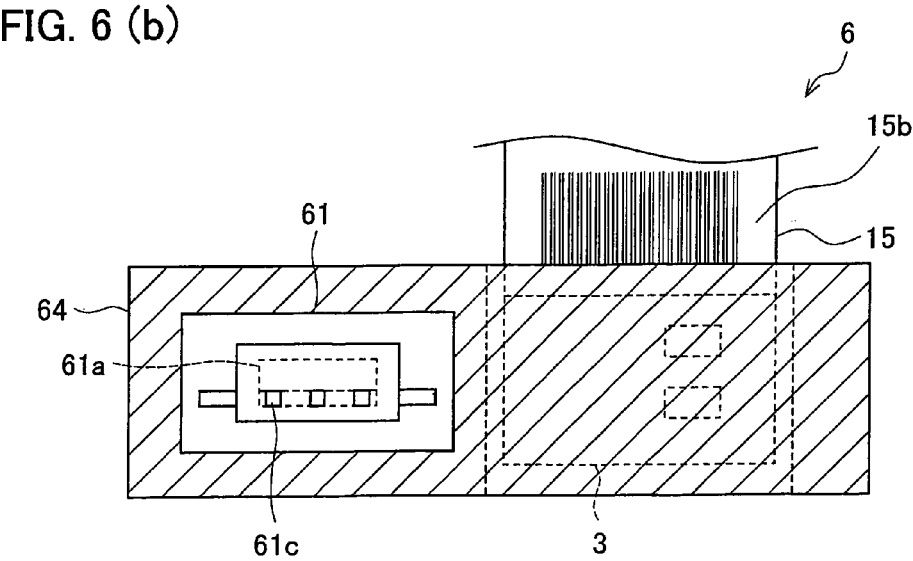
Figure 8:
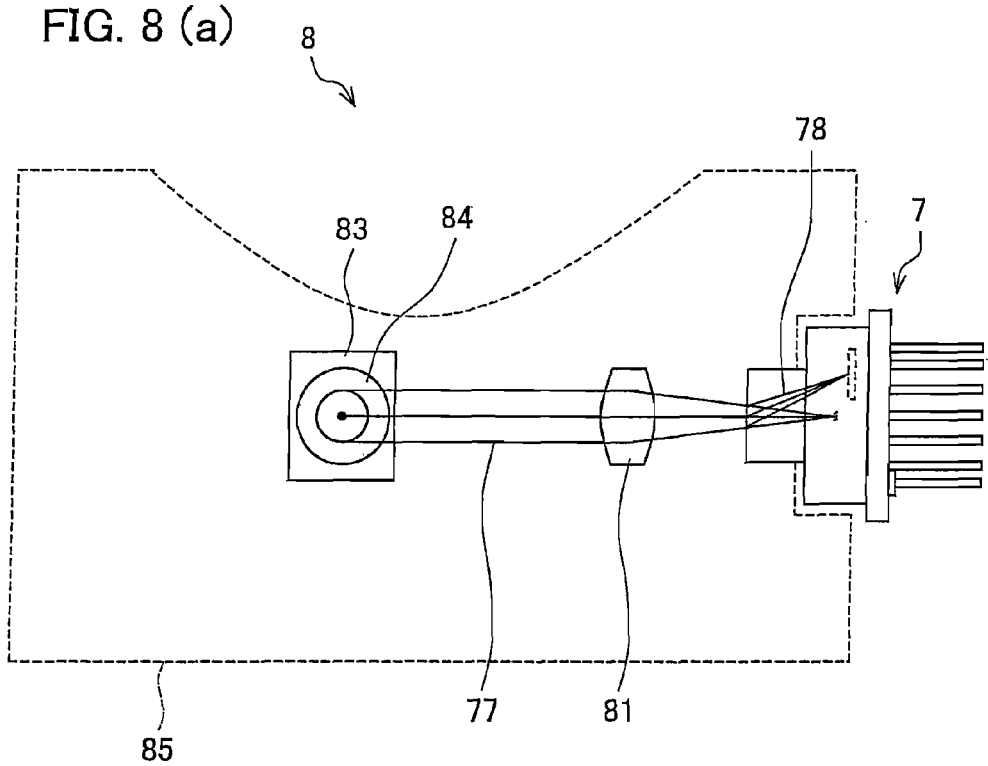
FIGS. 8(a) and 8(b) schematically illustrate an optical pickup device using a conventional hologram laser.
Figure 8:
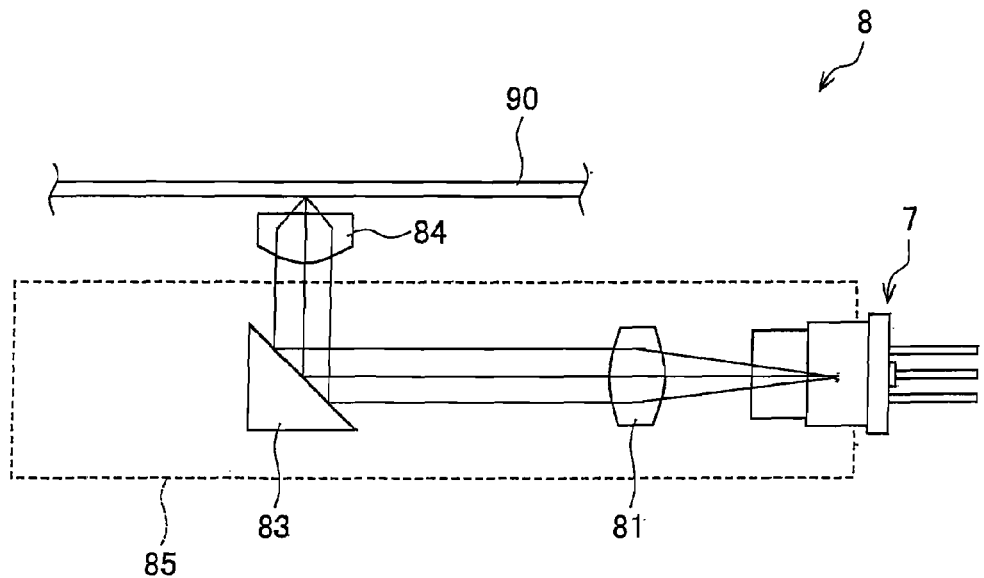

Next, with respect to FIGS. 6(a) and 6(b), the following explains another embodiment of the present invention. An optical integrated module 6 according to the present embodiment has the same structure as the optical integrated module according to the foregoing embodiment except that the optical integrated module 6 uses a semiconductor laser including a lead-frame package instead of the semiconductor laser including the CAN package. Note that, members having the same functions as those described in the foregoing embodiment are given the same signs and explanations thereof are omitted here.

A blue-violet semiconductor laser (laser) 61 includes: a semiconductor laser chip (laser chip) 61b; a lead-frame package 61a having a window at its end; and leads 61c.

The laser chip 61b is mounted on the lead-frame package 61a and the anode and the cathode of the laser chip 61b are connected with the leads 61c via metal wires. Further, the laser 61 is supported by and fixed with a support section 64c of a support member 64.

The following explains a process for fabricating the laser 61 including the lead-frame package 61a. A plurality of the laser chips 61b are packaged (die-bonded/wire-bonded) on predetermined positions of a large lead-frame substrate, and then the lead-frame substrate is divided into pieces so that each of the pieces has a predetermined size. As a result, it is possible to fabricate at once the lead-frame substrates each of which has the laser chip 61b packaged thereon. Thereafter, the lead-frame substrate is packaged and thus the lead-frame package 61a is fabricated. At that time, it is possible to package the laser chips 61b at once, unlike the case where the laser chip 61b is mounted on individual lead-frame substrate. As a result, it is possible to reduce the number of working processes and to suppress the costs.

Further, generally, the thickness of a semiconductor laser including the lead-frame package is approximately 2mm, so that it is possible to make the thickness of the optical integrated module thinner, compared with the case where the semiconductor laser including a CAN package whose diameter ranges from 5.6 mm or 3.3 mm is mounted. Further, it is possible to fabricate the optical integrated module with lower costs than the case where the semiconductor laser including the CAN package is mounted.

Further, the laser 61 is supported by and fixed with the support section 64c of the support member 64, and the position of the laser 61 in relation to the light-receiving element 3 supported by a concave section 64a of the support member 64 may be adjusted in the same manner as in the foregoing embodiment. Other members and explanations thereof are omitted here because they are substantially the same as in the foregoing embodiment.

Further, in the present embodiment, the optical integrated module including the blue-violet semiconductor laser is explained. However, the present invention is easily applicable to a red semiconductor laser or an infrared semiconductor laser. Further, the present invention is also applicable to an optical pickup device which includes a plurality of optical integrated modules and corresponds to a plurality of standards.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The optical integrated module and the optical pickup device according to the present invention are applicable to a recording/reproducing device for recording/reproducing information to/from an optical recording medium such as an optical disc.

What is claimed is:

1. An optical integrated module, comprising:
a support member having an opening in a side surface thereof;
a light source for emitting light onto an optical recording medium, where the light source is supported by the support member; and
splitting means for separating the light emitted by the light source from reflected light reflected by the optical recording medium;
a photodetector which includes (i) a light-receiving section for receiving the reflected light thus separated and (ii) input/output terminals for being connected with an external circuit;
a flexible substrate connected with the external circuit;
wherein the flexible substrate is electrically connected with the input/output terminals and at least a part of the flexible substrate is provided between the photodetector and the support member;
wherein the photodetector is provided at a place of the splitting means from which place the reflected light goes out; and
wherein the flexible substrate extends from within the support member through the opening in the support member to outside the support member to the external circuit.

2. The optical integrated module as set forth in claim 1, wherein:
the splitting means includes (a) a first reflective surface which separates the emitted light from the reflected light, and (b) a second reflective surface which is provided so as to be parallel to the first reflective surface and which reflects the reflected light reflected by the first reflective surface, and
the first reflective surface and the second reflective surface are provided so as to be inclined at an angle of 45 degrees, with respect to an optical axis of the emitted light, to a side where the photodetector is provided.

3. The optical integrated module as set forth in claim 1, wherein the support member includes a concave section for containing the photodetector therein.

4. The optical integrated module as set forth in claim 3, wherein the concave section is formed so as to support the splitting means.

5. The optical integrated module as set forth in claim 1, wherein the photodetector is fixed to a place of the splitting means from which place the reflected light goes out.

6. The optical integrated module as set forth in claim 1, wherein the light source is fixed with a holder fixed with the support member.

7. An optical pickup device, comprising:
a light source for emitting light onto an optical recording medium;
an objective lens for converging onto the optical recording medium the light emitted by the light source;
splitting means for separating the light emitted by the light source from reflected light that is reflected by the optical recording medium;
a photodetector for receiving the reflected light thus separated;
a first flexible substrate including a connecting terminal section to be connected with an external circuit;
a support member with which the light source is fixed, said support member having an opening in a side surface thereof;
a second flexible substrate for connecting the photodetector with the external circuit;
wherein the photodetector includes input/output terminals for being electrically connected with the external circuit and is provided at a place of the splitting means from which place the reflected light goes out;
wherein the second flexible substrate is electrically connected with the input/output terminals and at least a part of the second flexible substrate is provided between the photodetector and the support member; and
wherein the second flexible substrate extends from within the support member through the opening in the support member to outside the support member to the external circuit.

8. The optical pickup device as set forth in claim 7, wherein the photodetector is fixed to a place of the splitting means from which place the reflected light goes out.

9. The optical pickup device as set forth in claim 7, wherein the light source is fixed with a holder fixed with the support member.

10. The optical pickup device as set forth in claim 7, wherein the support member includes a concave section for containing (i) the photodetector and (ii) at least a part of the second flexible substrate.

11. The optical pickup device as set forth in claim 7, wherein the support member includes, between the light source and the photodetector, a partition for preventing unnecessary stray light which came out of the light source from entering into the photodetector.

12. The optical pickup device as set forth in claim 7, wherein:
the splitting means includes (a) a first reflective surface which separates the emitted light from the reflected light, and (b) a second reflective surface which is provided so as to be parallel to the first reflective surface and which reflects the reflected light reflected by the first reflective surface, and the first reflective surface and the second reflective surface are provided so as to be inclined at an angle of 45 degrees, with respect to an optical axis of the emitted light, to a side where the photodetector is provided.

13. The optical pickup device as set forth in claim 7, wherein the support member includes a concave section for containing the photodetector therein.

14. The optical pickup device as set forth in claim 13, wherein the concave section is formed so as to support the splitting means.

15. The optical integrated module as set forth in claim 1, wherein:

the light emitting from the light source is in a first direction and the reflecting light impinging on the photodetector is in a second direction, and the first direction and the second direction are essentially parallel to each other.

16. The optical pick-up device as set forth in claim 7, wherein:

the light emitting from the light source is in a first direction and the reflecting light impinging on the photodetector is in a second direction, and the first direction and the second direction are essentially parallel to each other.

17. The optical integrated module as set forth in claim 1, wherein the photodetector is fixed to the flexible substrate.

18. The optical pickup device as forth in claim 7, wherein the photodetector is fixed to the second flexible substrate.

* * * * *